US012108276B2

(12) United States Patent
Ahmad et al.

(10) Patent No.: US 12,108,276 B2
(45) Date of Patent: *Oct. 1, 2024

(54) QUALITY OF SERVICE MANAGEMENT FOR INTERWORKING BETWEEN DIFFERENT COMMUNICATION ARCHITECTURES

(71) Applicant: InterDigital Patent Holdings, Inc., Wilmington, DE (US)

(72) Inventors: Saad Ahmad, Montreal (CA); Guanzhou Wang, Brossard (CA); Mahmoud Watfa, Saint Leonard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,950

(22) Filed: Mar. 6, 2023

(65) Prior Publication Data

US 2023/0209395 A1 Jun. 29, 2023

Related U.S. Application Data

(63) Continuation of application No. 17/241,965, filed on Apr. 27, 2021, now Pat. No. 11,622,292, which is a (Continued)

(51) Int. Cl.
*H04W 28/02* (2009.01)
*H04L 69/08* (2022.01)
(Continued)

(52) U.S. Cl.
CPC ......... *H04W 28/0268* (2013.01); *H04L 69/08* (2013.01); *H04W 28/12* (2013.01); *H04W 36/0044* (2013.01); *H04W 36/14* (2013.01)

(58) Field of Classification Search
CPC ............... H04L 47/24; H04L 47/2491; H04W 28/0268; H04W 28/16; H04W 28/24; (Continued)

(56) References Cited

U.S. PATENT DOCUMENTS

| 2014/0078898 | A1 | 3/2014 | Anchan et al. |
| 2014/0233380 | A1 | 8/2014 | Kim et al. |
| 2018/0192333 | A1 | 7/2018 | Wu |
| 2018/0192471 | A1* | 7/2018 | Li ........................ H04W 36/14 |

(Continued)

FOREIGN PATENT DOCUMENTS

| CN | 103096314 A | 5/2013 |
| WO | 2011153413 A1 | 12/2011 |

(Continued)

OTHER PUBLICATIONS

3GPP TR 23.799 V1 .2.1, "Third Generation Partnership Project", Technical Specification Group Services and System Aspects; Study on Architecture for Next Generation System (Release 14), Nov. 2016.

(Continued)

*Primary Examiner* — Pao Sinkantarakorn
(74) *Attorney, Agent, or Firm* — Flaster Greenberg P.C.

(57) ABSTRACT

Procedures, systems, and devices for addressing quality of service (QoS) during an inter-system change of a wireless transmit/receive unit (WTRU) are discussed herein. A WTRU may send a packet data unit (PDU) modification request to a network node, such as a session management function (SMF) device, indicating support for reflective quality of services (RQoS). In response to the modification request, the WTRU may then receive an acknowledgment, after which the WTRU may then be able to send data for a PDU of a specific RQoS. The RQoS may be specific to a single PDU or a plurality of PDUs. The modification request may include Session Management (SM) and/or Mobility Management (MM) information. The modification request (Continued)

may be included in an attach procedure or a tracking area update (TAU).

20 Claims, 12 Drawing Sheets

Related U.S. Application Data continuation of application No. 16/475,854, filed as application No. PCT/US2018/012761 on Jan. 8, 2018, now Pat. No. 10,993,139.

(60) Provisional application No. 62/575,978, filed on Oct. 23, 2017, provisional application No. 62/572,160, filed on Oct. 13, 2017, provisional application No. 62/444,124, filed on Jan. 9, 2017.

(51) Int. Cl.
    *H04W 28/12*    (2009.01)
    *H04W 36/00*    (2009.01)
    *H04W 36/14*    (2009.01)

(58) Field of Classification Search
    CPC .......... H04W 36/0022; H04W 36/0033–0044; H04W 36/0055–0077
    See application file for complete search history.

(56) References Cited

U.S. PATENT DOCUMENTS

| | | | |
|---|---|---|---|
| 2018/0242205 A1 | 8/2018 | Mildh et al. | |
| 2018/0359662 A1* | 12/2018 | Kim | H04W 36/0022 |
| 2019/0150225 A1* | 5/2019 | Mohamed | H04W 36/0022 370/329 |
| 2019/0289506 A1 | 9/2019 | Park et al. | |
| 2019/0297538 A1 | 9/2019 | Keller et al. | |
| 2020/0053803 A1* | 2/2020 | Youn | H04L 47/19 |
| 2020/0145953 A1 | 5/2020 | Youn et al. | |

FOREIGN PATENT DOCUMENTS

| | | |
|---|---|---|
| WO | 2012154542 A1 | 11/2012 |
| WO | 2015160329 A1 | 10/2015 |

OTHER PUBLICATIONS

3GPP TR 23.799 V1.2.0 , "Third Generation Partnership Project", Technical Specification Group Services and System Aspects; Study on Architecture for Next Generation System (Release 14), Nov. 2016.
3GPP TS 23.203 V14.2.0 , "Third Generation Partnership Project", Technical Specification Group Services and System Aspects; Policy and charging control architecture (Release 14), Dec. 2016.
3GPP TS 23.203 V14.5.0 , "Third Generation Partnership Project", Technical Specification Group Services and System Aspects; Policy and charging control architecture (Release 14), Sep. 2017.
3GPP TS 23.203 V15.1.0 , "Third Generation Partnership Project", Technical Specification Group Services and System Aspects; Policy and charging control architecture (Release 15), Dec. 2017.
3GPP TS 23.401 V14.2.0 , "Third Generation Partnership Project", Technical Specification Group Services and System Aspects; General Packet Radio Service (GPRS) enhancements for Evolved Universal Terrestrial Radio Access Network (E-UTRAN) access (Release 14), Dec. 2016.
3GPP TS 23.401 V14.6.0 , "Third Generation Partnership Project", Technical Specification Group Services and System Aspects; General Packet Radio Service (GPRS) enhancements for Evolved Universal Terrestrial Radio Access Network (E-UTRAN) access (Release 14), Dec. 2017.
3GPP TS 23.401 V15.2.0 , "Third Generation Partnership Project", Technical Specification Group Services and System Aspects; General Packet Radio Service (GPRS) enhancements for Evolved Universal Terrestrial Radio Access Network (E-UTRAN) access (Release 15), Dec. 2017.
3GPP TS 23.501 V1 .4.0 , "Third Generation Partnership Project", Technical Specification Group Services and System Aspects; System Architecture for the 5G System; Stage 2 (Release 15), Sep. 2017.
3GPP TS 23.501 V15.0.0 , "3rd Generation Partnership Project", Technical Specification Group Services and System Aspects; System Architecture for the 5G System; Stage 2 (Release 15), 2017-12-22, 181 Pages.
3GPP TS 23.502 V15.0.0 , "Third Generation Partnership Project", Technical Specification Group Services and System Aspects; Procedures for the 5G System; Stage 2 (Release 15), Dec. 2017.
3GPP TS 24.501 V0.2.2 , "Third Generation Partnership Project", Technical Specification Group Core Network and Terminals; Non-Access-Stratum (NAS) protocol for 5G System (5GS); Stage 3 (Release 15), Dec. 2017.
S2-166455 , "Update of solution 18.4 to support QoS mapping on Common IP Anchor", SAMSUNG, vol. SA WG2, No. Reno, Nevada (US); XP051185017, Nov. 14, 2016.
S2-166597 , "Uplink Reflective QoS", Samsung, SA WG2 Meeting #118, Reno, US, Nov. 14-18, 2016.
S2-170356 , "5.16 Interworking and Migration", SAMSUNG, SA WG2 Meeting #118-BIS, Spokane, WA, USA, Jan. 16-20, 2017.
S2-170590 , "23.501: Way forward for NGC-EPC interworking", Intel, 3GPP TSG SA WG2 Meeting #118bis, Spokane, WA, USA, Jan. 16-20, 2017.
S2-175613 , "TS23.501: QoS control for unstructured POU session", Huawei et al., SA WG2 Meeting #122Bis, Sophia Antipolis, France, Aug. 21-25, 2017.
S2-176145 , "Clarifications for HO procedure from 5GS to EPC with SR UE using N26", China Mobile et al., SA WG2 Meeting #122bis, Sophia Antipolis, France, Aug. 21-25, 2017.
S2-176559 , "Packet Filter extension for Ethernet POU session", Qualcomm Incorporated et al., SA WG2 Meeting #122-BIS, Sophia Antipolis, France, Aug. 21-25, 2017.
S2-178583 , "TS23.501: Reflective QoS Indication for Interworking between EPS and 5GS", Interdigital, Inc., SA WG2 Meeting #S2-124, S2-178583, Reno, Nevada, USA, Nov. 27-Dec. 1, 2017.
S2-179022 , "TS23.501: Reflective QoS Indication for Interworking between EPS and 5GS", Interdigital Inc., SA WG2 Meeting #S2-124, Reno, Nevada, USA, Nov. 27-Dec. 1, 2017.
TR 23.799 V14.0.0 , "3rd Generation Partnership Project (3GPP)", Technical Specification Group Services and System Aspects, Study on Architecture for Next Generation System (Release 14), Dec. 2016, pp. 1-522.

\* cited by examiner

QUALITY OF SERVICE MANAGEMENT FOR INTERWORKING BETWEEN DIFFERENT COMMUNICATION ARCHITECTURES

CROSS REFERENCE TO RELATED APPLICATIONS

This application is the continuation application of U.S. patent application Ser. No. 17/241,965, filed Apr. 27, 2021, which is a continuation of U.S. patent application Ser. No. 16/475,854, filed Jul. 3, 2019, which issued as U.S. Pat. No. 10,993,139 on Apr. 27, 2021, which is the U.S. National Stage, under 35 U.S.C. § 371, of International Application No. PCT/US2018/012761, filed Jan. 8, 2018, which claims the benefit of U.S. Provisional Application 62/575,978, filed Oct. 23, 2017, U.S. Provisional Application 62/572,160, filed Oct. 13, 2017, and U.S. Provisional Application 62/444,124, filed Jan. 9, 2017, the contents of which are hereby incorporated by reference herein.

BACKGROUND

In wireless communication system architecture, an evolved packet core (EPC) network is a framework for providing converged voice and data on a LTE network. As wireless standards evolve, the EPC may be used in combination with other types of core networks to facilitate a wireless transmit/receive unit (WTRU) to operate universally. In 5G networks, a NextGen core (NGC) network may operate, but how it will interwork with existing networks needs to be addressed.

SUMMARY

Procedures, systems, and devices for addressing quality of service (QoS) during an inter-system change of a wireless transmit/receive unit (WTRU) are discussed herein. A WTRU may send a packet data unit (PDU) modification request to a network node, such as a session management function (SMF) device, indicating support for reflective quality of service (RQoS). In response to the modification request, the WTRU may then receive an acknowledgment, after which the WTRU may then be able to send data for a PDU of a specific RQoS. The RQoS may be specific to a single PDU or a plurality of PDUs. The modification request may include Session Management (SM) and/or Mobility Management (MM) information. The modification request may be included in an attach procedure or a tracking area update (TAU).

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
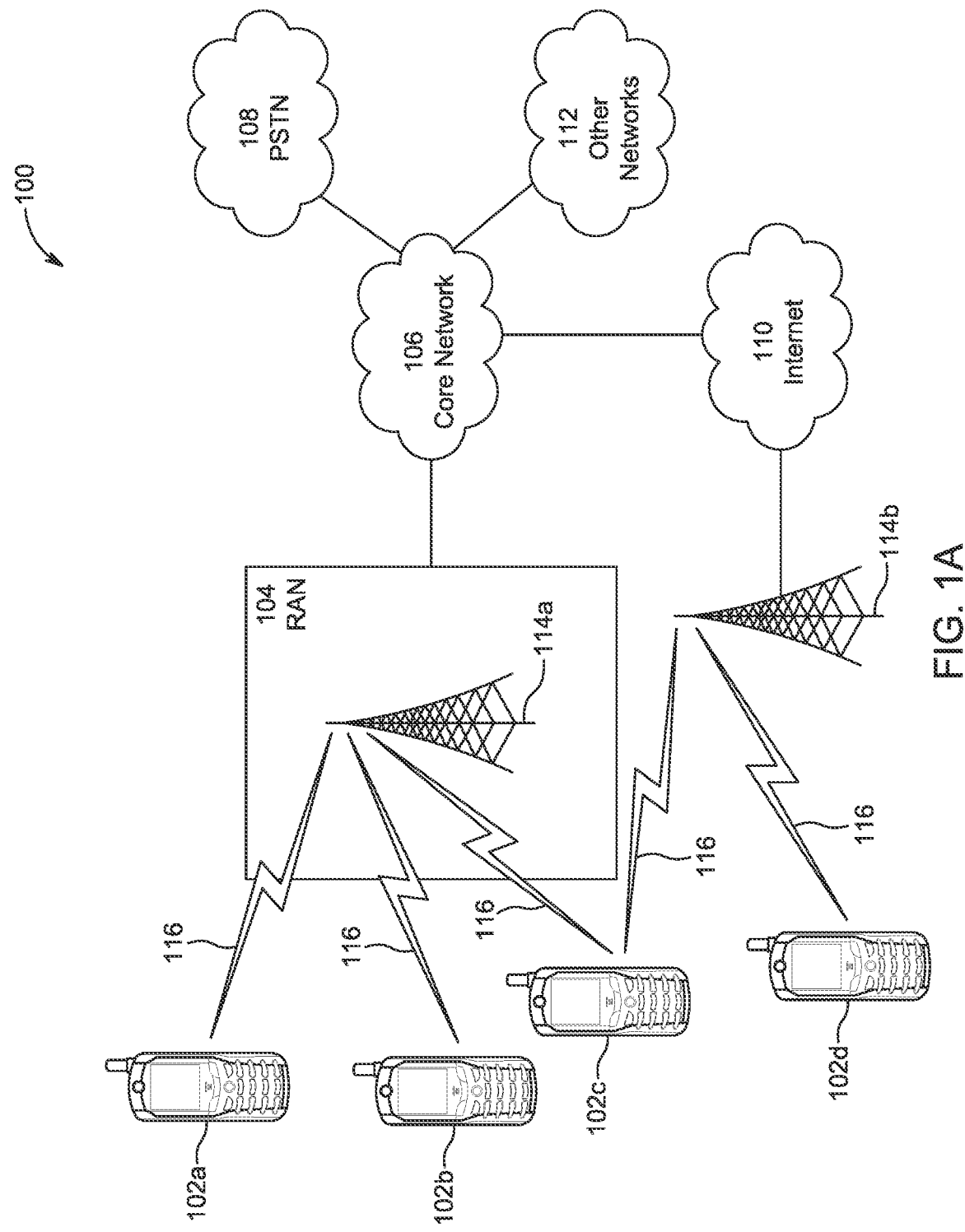
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a Core Network (CN) 106/115, a public switched telephone network (PSTN) 108, the Internet 110, and other networks 112, though it will be appreciated that the disclosed embodiments contemplate any number of WTRUs, base stations, networks, and/or network elements. The CN may be representative of a NextGen Core (NGC) network, such as a 5G system using New Radio (NR). Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT)

device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as New Radio (NR) Radio Access, which may establish the air interface 116 using (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
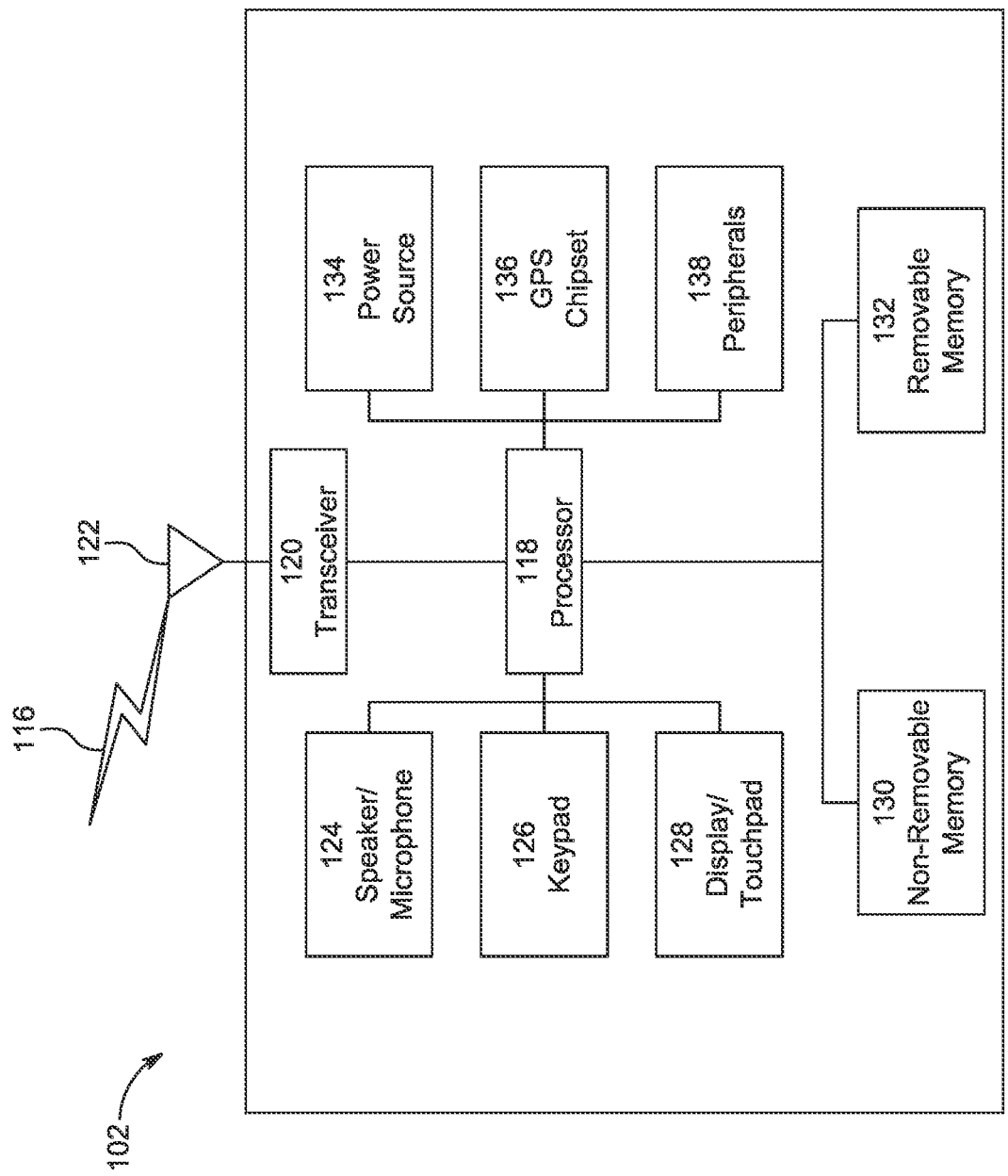
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
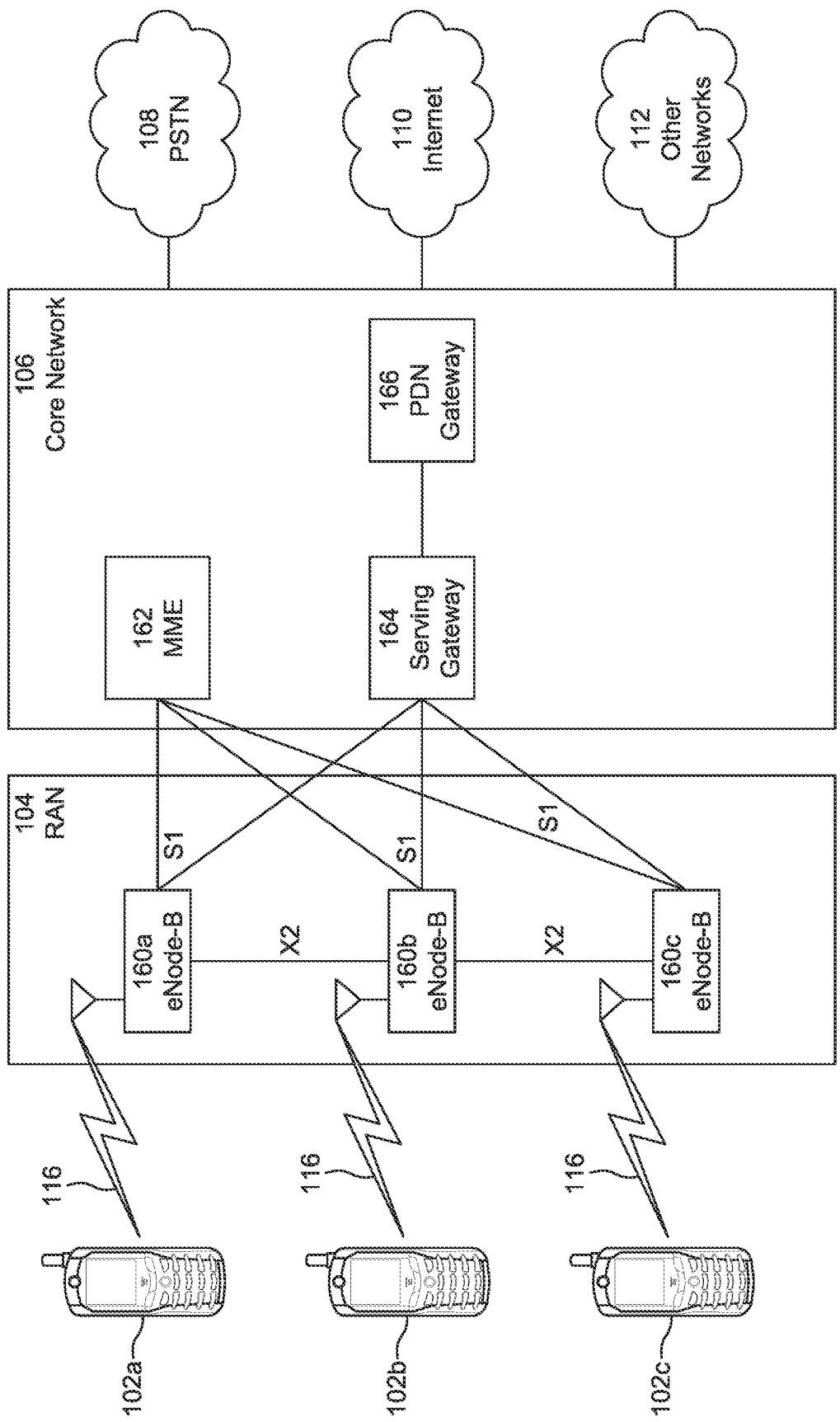
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
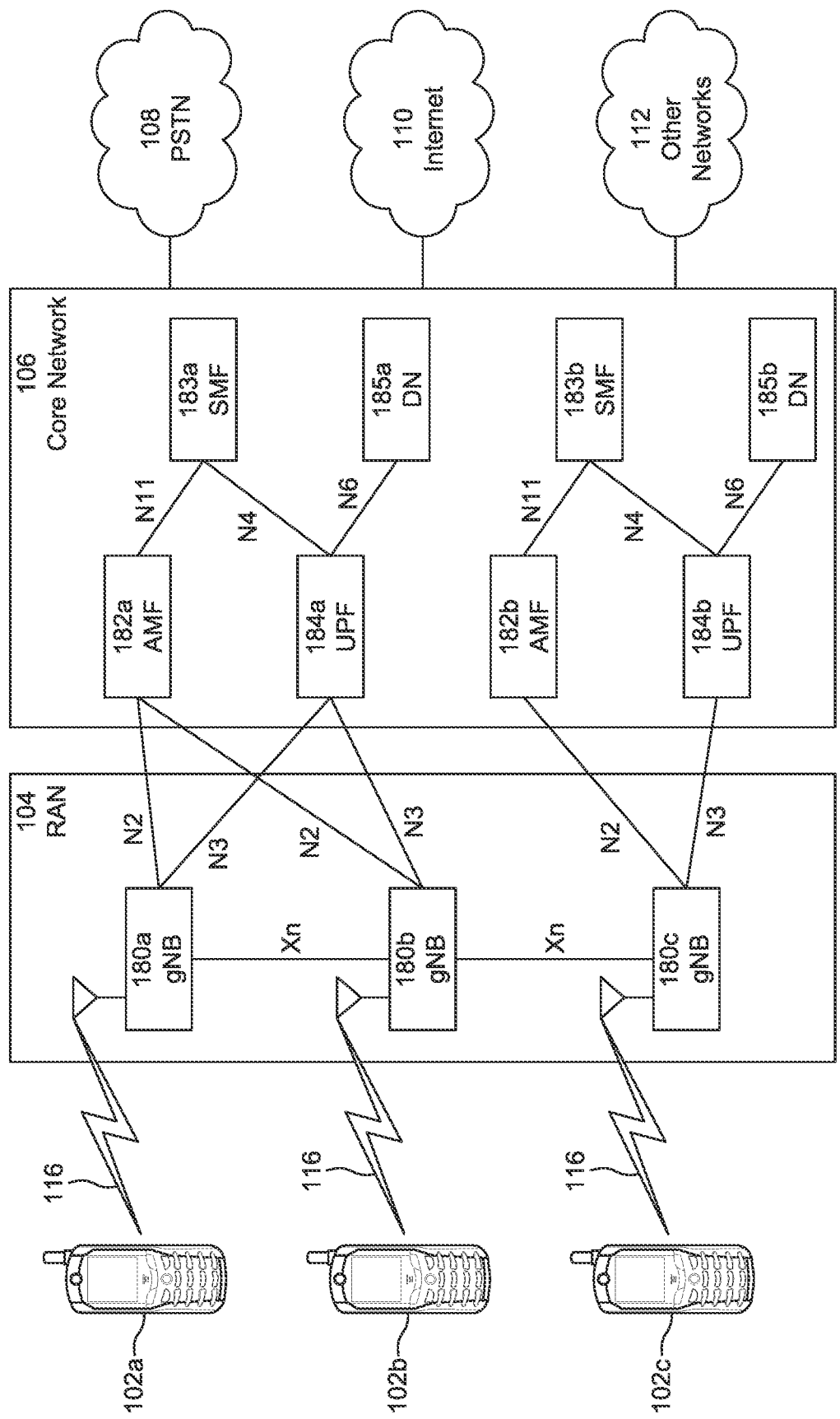
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. The AMF 182a, 182b, UPF 184a, 184b, and SMF 183a, 183b may be the same or different types of devices, the hardware of those devices may comprise of a processor, memory, transceiver, and other data interfaces as necessary. In one example, the AMF 182a, 182b, UPF 184a, 184b, and SMF 183a, 183b hardware may be similar to the hardware of a WTRU as described herein. In another example, each of the AMF 182a, 182b, UPF 184a, 184b, and SMF 183a, 183b may comprise of more than one device. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
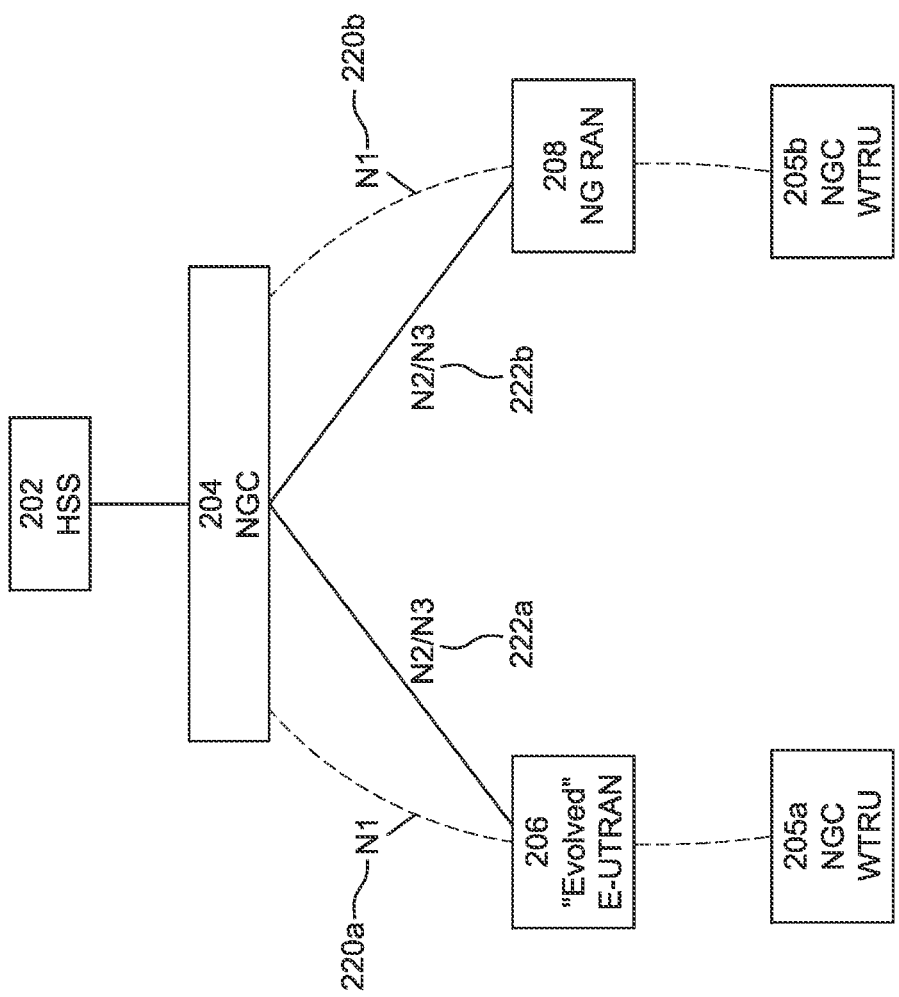
FIG. 2 is an example architecture of interworking between an EPC and a NextGen system according to one or more embodiments.

FIG. 2 shows an example of an architecture for tight interworking of an evolved packet core (EPC) network and a NextGen (NG) core (NGC) network. According to the example of FIG. 2, a Home Subscriber Server (HSS) 202 may communicate with an NGC 204. An operator may deploy an NG RAN 208, such as for 5G new radio (NR), in conjunction with an EPC and upgrade, or "evolve", all the installed E-UTRAN nodes 206 to support the new NGC 204. The NGC 204 may communicate with the "Evolved" E-UTRAN 206 and the NG RAN 208 over an N2/N3 interface, 222a and 222b respectively. The NGC 204 may communicate with an NGC WTRU 205a and 205b over an N1 connection, 220a and 220b, respectively. In this example, service continuity to a NGC WTRU, such as 205a or 205b, is only provided between the "Evolved" E-UTRAN 206 and the NG RAN 208 connected to the NGC 204. Further, when an E-UTRAN is "Evolved" by supporting access to the NGC 20, then interworking, such as idle and connected mode mobility, may be performed using NGC procedures.

Figure 3:
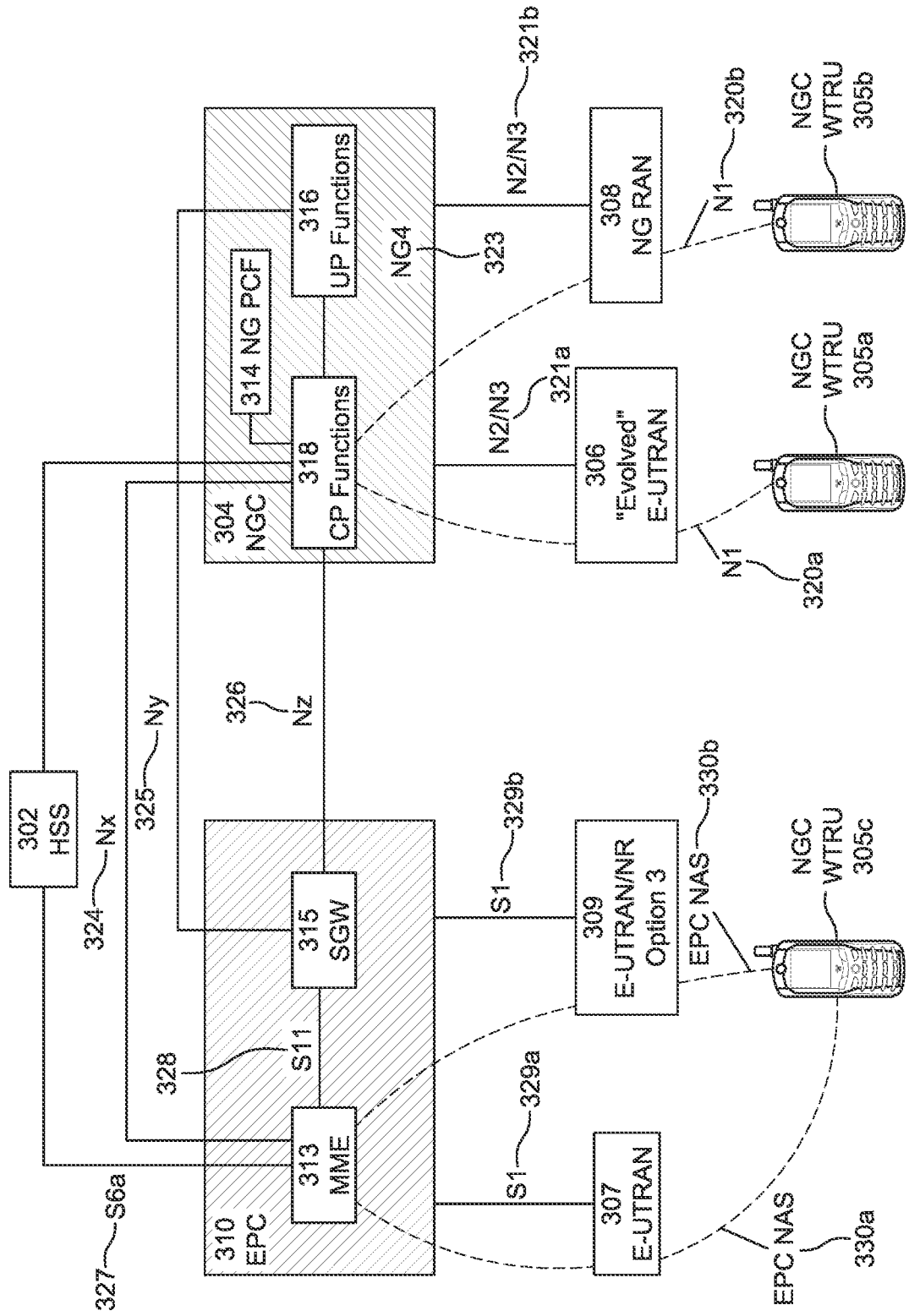
FIG. 3 is an example architecture of interworking between an EPC and a NextGen system according to one or more embodiments.

FIG. 3 shows an example of an architecture for the interworking of an EPC and an NG CN where there is non-roaming and roaming with local breakout possibilities. In the example of FIG. 3, an operator of an EPC 310 has not upgraded installed E-UTRAN node(s) 307, has upgraded or "Evolved" some installed E-UTRAN node(s) 306 to support the new NGC 304 over N2/N3 321a, or has deployed an E-UTRAN/NR 309 scenario, also known as an "Option 3", for macro coverage with a stand-alone NR component connected to the NGC (e.g., for small cells). Option 3 309 may provide for dual connectivity deployments where E-UTRA may be the anchor radio access technology (RAT) and NR may be the secondary RAT connected to EPC via an eNB. Further, core network interworking between EPC 310 and NGC 304 may be provided for full service continuity. Interfaces Nx 324 and Ny 325 may be introduced between the MME 313 and SGW 315 respectively and the Nz 326 interface may be defined between the SGW 315 and the CP function 318 in order to enable interworking between the EPC 310 and the NGC 304. Nx 324 and Ny 325 may be inter-core network interfaces for the c-plane and u-plane respectively and may correspond to inter-NGC interfaces. Additionally, N4 323 interfaces may be introduced between the CP functions 318 and UP functions 316. The NG point coordination function (PCF) 314 may be involved if policy and charging is controlled in a dynamic manner. The NG PCF 314 may be capable of supporting functionalities of Evolved Packet System (EPS) policy and changing rules function (PCRF).

In the example of FIG. 3, in one scenario when connecting to a E-UTRAN, such as 307 and/or 309, a WTRU, such as the NGC WTRU 305c, may use EPC NAS 330a and 330b. In such a scenario, when connected to a non-evolved E-UTRAN 307 and 309, the WTRU authentication, mobility management, and session management may be performed by the MME 312 towards the NGC WTRU 305c.

Further in FIG. 3, in order to support idle or connected mode mobility between the EPC 310 and the NGC 304, the WTRU's serving MME 313 may connect via a control plane Nx 324 interface to CP functions 318 in the NGC 304, and the WTRU's serving SGW 314 may connect via a user plane Ny 325 interface to UP functions 316 and via a control plane Nz 326 interface to CP functions 318. The user plane may always be anchored in NGC 304 for NGC WTRU 305c with an associated subscription. The GW selection may be done by the MME 313, and based on a WTRU subscription that enables 5G, the GW selection may result in a selection of a GW in the NGC 304.

As discussed herein, for interworking with NGC 304 an NGC WTRU 305c may perform an initial attach over E-UTRAN 307 or 309 using EPC NAS 330a or 330b respectively and later move to an Evolved E-UTRAN 306 or NG RAN 308 connected with N1 320a and 320b (i.e., NG NAS) by interworking with the NGC 304 (e.g., moving a WTRU context from the EPC 310 to the NGC 304). During an initial attach a WTRU user plane may be anchored in the UP function 318 provided by the NGC 304 to support mobility. Interworking with a NGC 304 may also be performed by enabling an NGC WTRU 305a and/or 305b to perform an initial attach and session management over "Evolved" E-UTRAN 306 using N1 320a or NG RAN 308 using N1 320b, respectively; the NGC WTRUs 305a and/or 305b may then later move to E-UTRAN 307 using EPC NAS 330a and/or E-UTRAN Option 3 309 using EPC NAS 330b, respectively, by interworking with the NGC 304 (e.g., moving the WTRU 305a and/or 305b context from the NGC 304).

Service continuity may be provided between the E-UTRAN and the NG RAN options deployed by the operator via the Interworking Function and the common anchoring of the user plane.

Figure 4:
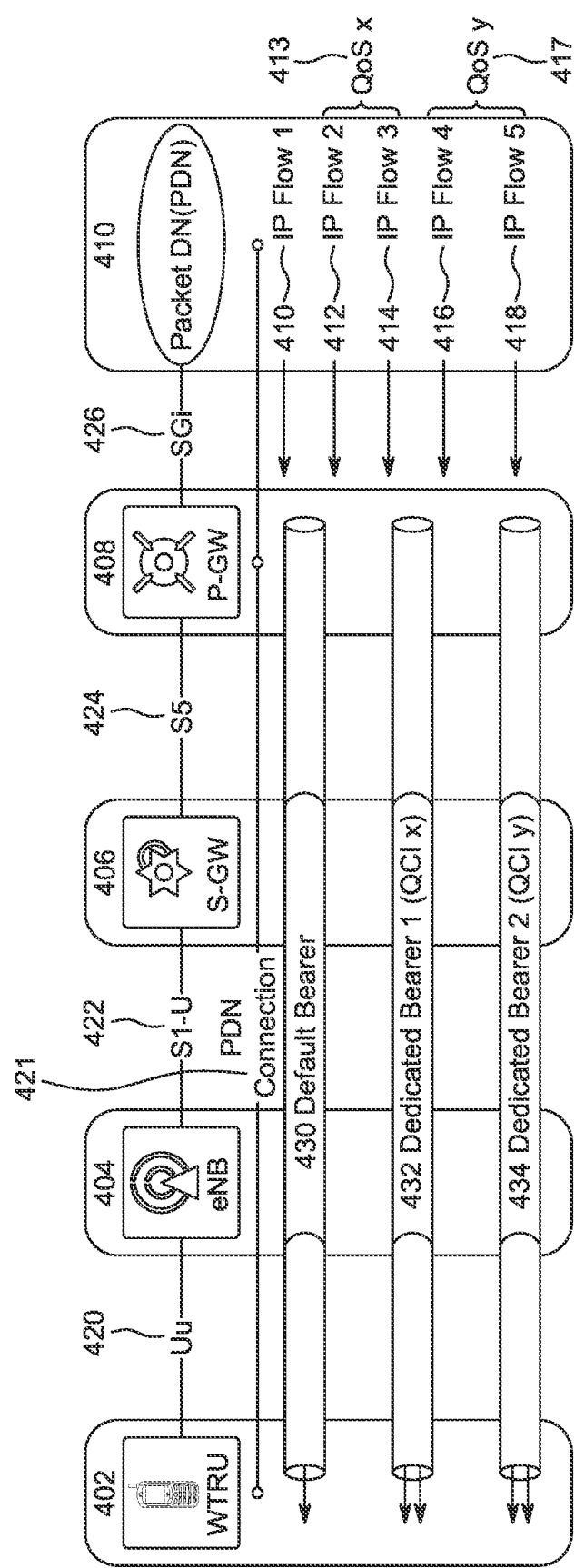
FIG. 4 is an example diagram of bearer based QoS model in EPC according to one or more embodiments.

FIG. 4 is an example of a bearer based on a QoS model in an EPC. A WTRU 402 may be connected over a Uu 420 to an eNB 404. The eNB 404 may be connected to an S-GW 406 via an S1-U connection 422. The S-GW 406 may be connected over an S5 connection 424 to a PGW 408. The PGW 408 may be connected to a Packet Data Network (PDN) 410 over an SGi 426 connection. The WTRU 402 may have a PDN connection 421 through the EPC to the PDN 410.

In this example, packets with different QoS characteristics, such as QoS Class Identifier (QCI) values in the EPC, are filtered into different end to end bearers between the WTRU 402 and the core network (e.g., PGW 408). There may be different flows such as IP flows 410, 412, 414, 416, and 418. In the example of FIG. 4, IP flows may require similar QoS treatment and may be grouped together, such as QoS x 413 which groups IP flows 412 and 414 or QoS y 417 which groups IP flows 416 and 418. The IP flows requiring similar QoS in the downlink are placed in the dedicated bearers (DBs) that can meet the QoS requirements of that IP flow, such as where DB 432 may be associated with a QCI of QoS x 413 and DB 434 may be associated with a QCI of a QoS y 417. In the example of FIG. 4, a default bearer 430 may be the first EPS bearer that is established simultaneously with the PDN connection; also, it may be associated with some default QoS treatments. IP flows that do not require specific QoS treatment and can be satisfied with default QoS treatment may go to the default bearer 430. A similar procedure (not shown) may happen at the WTRU in the uplink direction. The end to end QoS tunnel in EPC may consist of an S5 424 tunnel between PGW 406 & SGW 408, and/or an S1-U tunnel 422 between the SGW 408 & eNB 404. Further in FIG. 4, the packet flowing through a particular bearer or tunnel meets the same QoS treatment as it flows through these three tunnels (i.e., S5, S1-U and Uu) between the different nodes both in the uplink and downlink direction.

Figure 5:
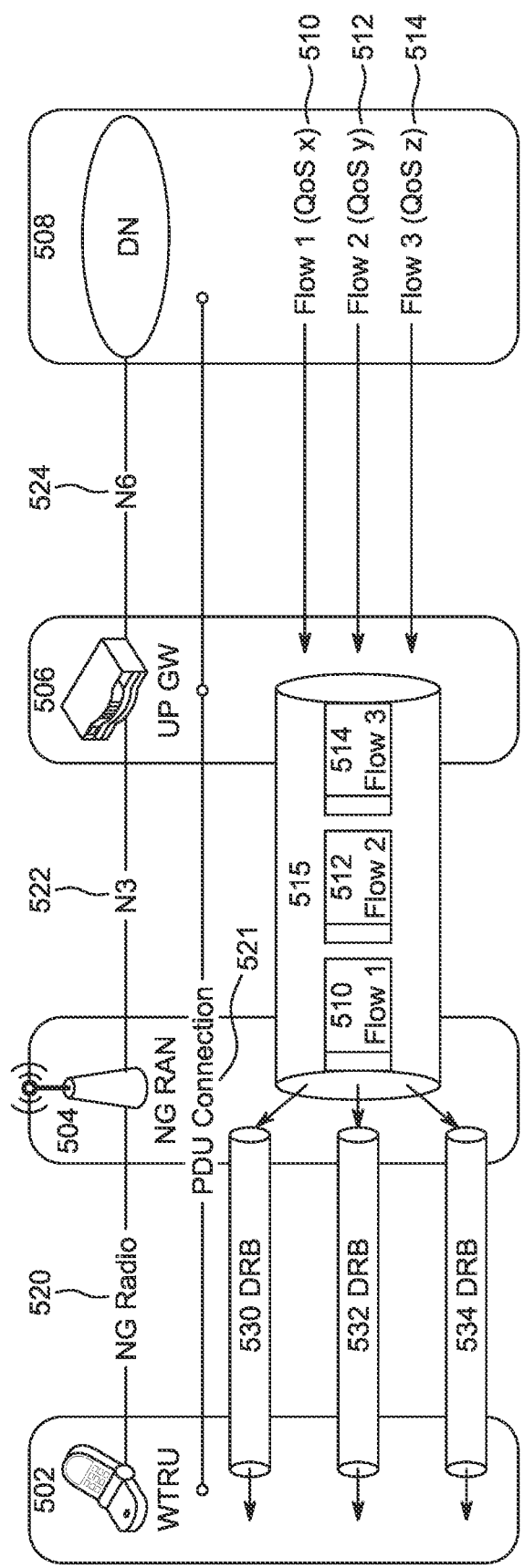
FIG. 5 an example diagram of QoS model in NextGen according to one or more embodiments.

FIG. 5 is an example of a user plane architecture for QoS management in an NG system. The architecture may comprise a WTRU 502 connected over NG radio 520 to a NextGen RAN (NG RAN) 504. The NG RAN 504 may be connected over an N3 interface 522 to an UP-GW 506. The UP-GW 506 may be connected to a Data Network (DN) 508 over a N6 interface 524. The DN 508 may have a PDU connection 521 to the WTRU 502 through this NGC.

In FIG. 5, unlike FIG. 4, dedicated bearers may not be implemented in the NGC and instead there may be a single tunnel (N3 interface) between the NG RAN 504 and User Plane Gateway (UP-GW) 506 through which all packets flow. Packet marking as part of the packet header may be used to identify IP packets from a data network (DN) 508 that require different QoS treatments, such as flow 1, 2, and 4 with QoS x 410, QoS y 412, and QoS z 414 respectively; in this example QoS x 410, QoS y 412, and QoS z 414 may be varying levels/degrees of QoS requirements for data contained in the IP packets of each flow. The marking is performed by the UP-GW 506 in the downlink direction and by the NG RAN 504 in the uplink direction. Based on the packet marking the NG RAN 504 may decide to place the packets in different dedicated radio bearers (DRBs) once outside the NGC, such as DRB 530, 531, and 533. The data with QoS x 410, QoS y 412, and QoS z 414 may be placed in DRB 530, 531, and 533 respectively, with each DRB being assigned one IP flow of data associated with one QoS. Each DRB may be created to meet the QoS requirement such as packet delay budget and/or packet error rate, etc., for different IP flows.

In one embodiment, there may be procedures to ensure interworking of QoS treatment between EPC and NextGen systems is maintained. In one scenario where the WTRU moves between the EPC system and NextGen system the handover may be seamless—service continuity is maintained—both in the direction from EPC to NextGen system and from NextGen system to EPC. If the handover is seamless, then from the perspective of applications running on a WTRU, the QoS treatment for a particular IP flow may be be the same. Procedures as discussed herein may ensure the seamless nature when the WTRU is moving between a NG and EPC system, or vice versa.

In one embodiment addressing QoS interworking between the NGC and EPC, the NG CP-Functions (Fxn), also referred to as an NG-CP, may perform an action such as sending new uplink traffic flow templates (TFTs) and/or packet filters to a WTRU. In an NG system, the packet filters may be sent to the WTRU by the RAN node meaning there may be no packet filters at the NAS level. Upon handing over to the E-UTRAN, the CP-Fxn may need to send the UL packet filters to the WTRU since the IP flows need to be separated into various dedicated bearers above the packet data convergence protocol (PDCP) level in the WTRU. The CP-Fxn may imitate N1 signaling between the WTRU by sending a modify bearer request message to the WTRU. One or more pieces of information may be included in the TFTs or the message sent over N1 to the WTRU.

In some embodiments there may be a Reflective QoS (RQoS) where a received stream/packet has a given QoS, and responding to that stream/packet will entail using the same QoS or a QoS that is based on the QoS of the received stream/packet, thereby being "reflective." In other words, a QoS may not be pre negotiated or pre setup with the node/party that transmitted the stream/packet for situations where RQoS is used, and instead may be reflected based on the QoS of the received stream/packet. Information included in the TFTs or the message sent over N1 to the WTRU may be an indication that an RQoS indication (RQI) is not applicable anymore. This indication may be part of explicit control plane signaling or the network may not include the RQI in the user plane packet (or packet header) sent to the WTRU.

Information included in the TFTs or the message sent over N1 to the WTRU may also be a mapping between QCI and flow based packet marking rules, such as a flow priority indicator (FPI), which may be sent to the WTRU by the CP-Fxn. This mapping may be a static mapping, such as where for every QCI there would be a corresponding FPI value. Alternatively, the network may send a dynamic mapping where for each service, an FPI of that service corresponds to an appropriate (different) or same QCI value. This concept may be applied to a case where the WTRU has multiple protocol data unit (PDU) connections for different services. In such a case, the CP-Fxn may send a different QCI-FPI mapping for each PDU connection. The CP-Fxn may make the mapping determination based on the PDU connection parameters (e.g., service type, slice type serving the PDU connection, WTRU capabilities, subscription information, and/or local policies).

Information included in the TFTs or the message sent over N1 to the WTRU may also be a packet marking information, determined by the NG, based on the intent level rules for a particular application possibly receiving such information from an application server. The intent level rules may not be applicable to the EPC system because of the bearer based model, hence, if intent level rules apply to an IP flow, the CP-Fxn may take the following actions: Inform the application server that the flow has been moved to the EPC system; request the application server or the policy node to convert the intent level QoS rules to the best possible transport level QoS rules; based on the actions described herein, the CP-Fxn may receive the transport level QoS rules, such as a particular FPI value, which may then be mapped to QCI by the CP-Fxn as previously described herein.

The NG CP-Fxns may also perform N2 signaling (between CP-Fxn and RAN) to the network. The CP-Fxn may have or may derive QCI information based on QoS characteristics for a particular PDU connection. The CP-Fxn may interact with a policy node and/or user subscription database to determine QCI values. Further, the CP-Fxn may send the mapping between the QCI and FPI (user plane marking) to the evolved eNB. This action may be required by the CP-Fxn since the user plane packets carried by the N3 tunnel between the UP-GW and eNB in the downlink direction may still have the marking as part of the packet header. The eNB may need to have information to convert the packet marking information to the QCI that may then be applied by the eNB to transmit the packet to the WTRU over a Uu interface by means of one or more data radio bearers (DRBs). Moreover, this mapping information may be used by the eNB to mark the packets received from the WTRU in the uplink direction before sending them to the UP-GW over the N3 tunnel.

Additionally, the NG CP-Fxns may perform an N3 interface update in a situation where there may be additional packet markings to specify the QCI value in the user plane packets, and therefore there may be no requirement to send the QCI to FPI mapping to the eNB as described herein.

Figure 6:
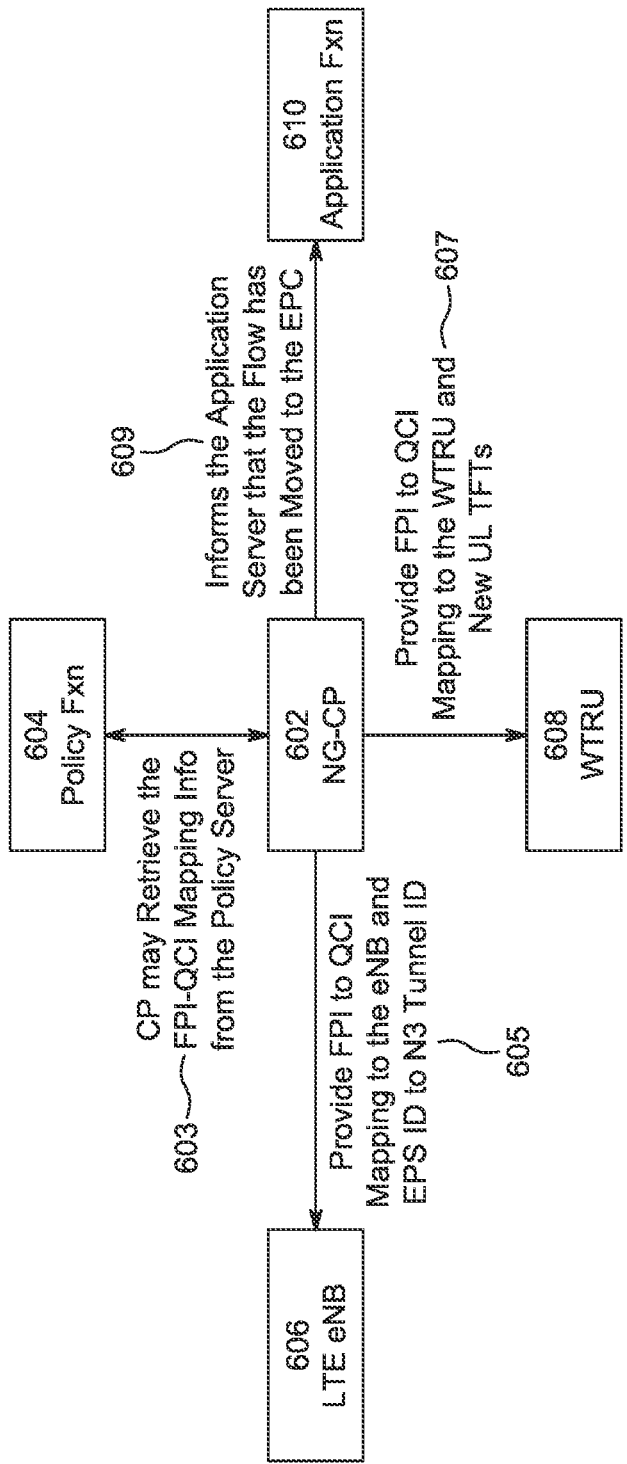
FIG. 6 is an example procedure where a WTRU transfers from one system to another according to one or more embodiment.

FIG. 6 shows a procedure that may be implemented utilizing the embodiments discussed herein concerning a network node in a 5G wireless communications system where a WTRU 608 is handed over from a NG system to an EPC system. An FPI to QCI mapping may be retrieved 603 from a policy server/Fxn by an NG CP 602. The NG CP 602 may then generate UL TFTs to enable the WTRU 608 to separate the 5G data flows into a plurality of dedicated bearers. The generated UL TFTs may each include an indication that the RQI may not be applicable in the EPC system. The NG CP 602 may send 605 the FPI to QCI mapping and EPS bearer identity to NG3 tunnel identity mapping to an eNB 606. The NG CP 602 may then send 607 the generated UL TFTs and FPI to QCI mapping information to the WTRU 608. The NG CP 602 may then send 609 a message that the 5G data flows have been handed over to the EPC system to an application server/Fxn 610.

In one embodiment addressing QoS interworking between the NG and EPC, the MME may perform actions upon handover to the EPC, such as trigger network initiated Modify Bearer Request (MBR) or Create Bearer Request (CBR) procedure to establish dedicated bearers for different FPI values. Alternatively or additionally, the MME may receive authorized FPI values for PDU connections active at the WTRU, which means the MME may have to convert the FPI values to QCI values. The MME may interact with the PCF and/or HSS to determine the conversion of FPI values to the QCI values.

In one embodiment addressing QoS interworking between the NG and EPC, the WTRU may perform a tracking area update (TAU) for idle mode mobility cases. Alternatively, the WTRU may perform a registration update when it moves from the NG system to the EPC system. In the event of either action, the WTRU may include certain information in the TAU request or other NAS message to the MME, such as when the WTRU communicates with the MME after moving to the EPC system, as is possible in the example of FIG. 3. Such information may include one or more of the following: pre-authorized FPI (the FPI values that were authorized by the CP-Fxn at the time of PDU session establishment); other FPI values, such as other than the pre-authorized values, used by the WTRU for a particular PDU connection (e.g., the WTRU has requested additional QoS support for IP flows during an on-going PDU connection); and/or, an indication of whether RQoS applies correspondingly to the authorized FPI values.

In one embodiment addressing QoS interworking between the NG and EPC, the WTRU may perform a modify bearer request procedure to establish dedicated bearers in the EPC system. The modify bearer procedure may be performed for every active PDU session. A dedicated bearer may then be established for different authorized FPI values by the MME.

In one embodiment addressing QoS interworking between the NG and EPC, actions taken by the network as described herein may be the result of actions taken by the WTRU for QoS management.

QoS treatments in either EPC or NG systems may be flow specific where traffic flows may need to be detected and recognized before they can be associated with certain QoS profiles. For IP data flows the traffic flow detection may be relatively straight forward as IP tuples can be conveniently used to form Traffic Flow Templates (TFT) or packet filters. Non-IP data flows, however, may be handled differently than IP data flows. Non-IP data may be carried in a separate PDU session from IP-based PDU sessions, and/or there may be no mixed IP data flows and/or non-IP data flows in one single PDU session. Further, within one non-IP PDU session there may be multiple non-IP data flows. In one or more embodiments, procedures and rules may be developed to perform differentiated QoS treatment as may be required for multiple non-IP data flows inside one PDU session. These rules and procedures may relate to non-IP traffic detection and identification. Additionally, in a reflective rule situation a WTRU may need to recognize UL data received from its non-IP application as a counter part of received DL data so the WTRU can apply the same QoS marking as received from the DL data.

In one embodiment for addressing QoS handling for non-IP data flows, each non-IP data flow may have a data header of a certain format. For example, there may be several types of non-IP data header formats: 1) One type of header format may be standardized, and in the header there is at least a pair of information elements that may be reversed for the UL and DL (e.g., Ethernet (802.3) or WLAN MAC (802.11) packets have a pair of "source address" and "destination address" in the header); 2) Another type of header format may be standardized, but may not have a pair of information elements that are reversed for the UL and DL; and 3) Another type of header format may not be standardized, or may only be standardized in a certain industry/application.

For the third example type of non-IP data format, these header formats may be less well-known and may be proprietary. For the first and second example types of non-IP data formats, these header formats may be standardized and/or known, but they may still be hard to detect if there are other non-IP data flows of different data formats mixed within the same PDU session since there is no distinctive "signature" information element in the header that can unambiguously point to a specific data format.

Figure 7:
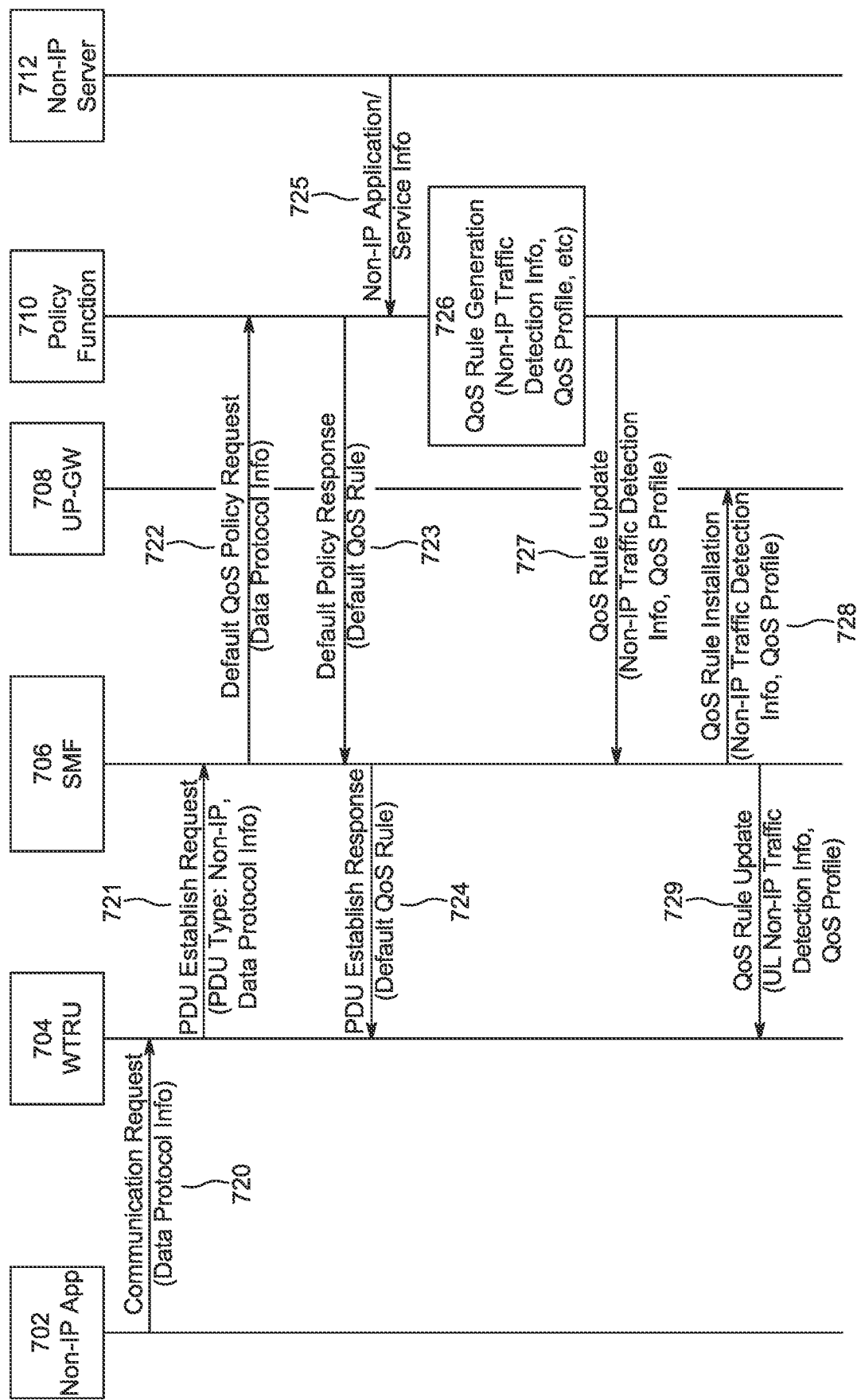
FIG. 7 is an example procedure for QoS rule generation for non-IP data that use well known data protocols according to one or more embodiments.

FIG. 7 shows an example procedure for QoS rule generation or application for non-IP data that uses known data protocols. In one embodiment, the WTRU 704 may receive 720 explicit information of the data protocol used in a communication request from a non-IP data application 702. Such information may contain the name of the data protocol, such as "802.3" or "Ethernet", the version number, and other related information. The WTRU 704 may include the data protocol information in the PDU session establishment request message sent 721 to the SMF 706 in the NGC. If the NGC supports the requested data protocol it may confirm the PDU session establishment, otherwise it may reject the request.

The SMF 706 that handles the non-IP PDU session may be configured with a default QoS rule and it may apply the default QoS rule for some or all of the non-IP data flows in the non-IP PDU session that uses the same data protocol. For those non-IP data flows that the default QoS rule applies to, the traffic template or packet filter for traffic detection may not be necessary. The SMF 706 may also request 722 the default QoS rule for the non-IP PDU session from the policy function 710 in the NGC, which may respond 723 with the default rule back to the SMF 706. The SMF 706 may provide 724 the same default QoS rule to the WTRU 704 during the PDU session establishment procedure.

For some non-IP data flows 725 coming from a non-IP server 712, the SMF 706 may also be able to receive 727 QoS rules which include the traffic detection information generated 726 by the policy function, similar to legacy EPC QoS policy framework. Once the SMF 706 receives the QoS rules, it may send them for installation in the UP-GW 708. The traffic detection information may be specific to the non-IP data protocol used by the PDU session. For example, the source MAC address and destination MAC address may be used as part of a TFT if the Ethernet data format is used. If the UL TFT can also be derived, which may be the case when there is a pair of reversible information elements available, such as source and destination address, the SMF 706 may construct the UL non-IP TFTs for some non-IP data flows and provide 729 them to the WTRU in a session management procedure, such as a QoS rule update.

If the WTRU receives an application data request from another non-IP application that requires a different data protocol, it may initialize the establishment of a separate PDU session for the different data protocol.

When a WTRU receives non-IP data from an application, the data may be accompanied with a Data Protocol indication and the WTRU may use this information to map the data to the corresponding non-IP PDU session that was previously created. If the UL QoS rule is available for the data flow, the WTRU may use the traffic detection rule to detect the data and apply the associated QoS profile (e.g., inserting QoS markings in the UL data), otherwise the WTRU may use the default QoS rule if available.

The RQoS treatment is also possible if there is a pair of reversible information elements in the header.

Figure 8:
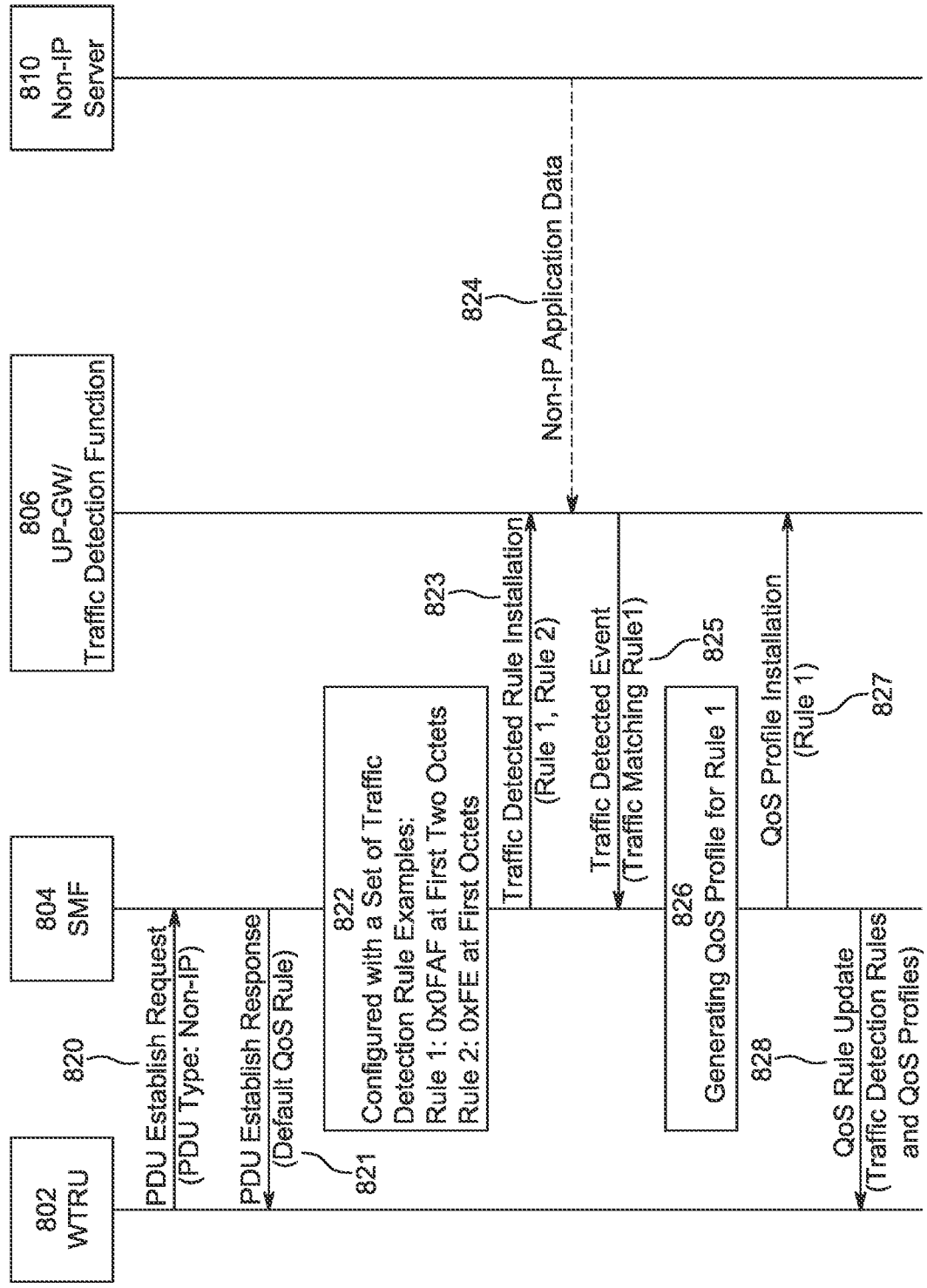
FIG. 8 is an example procedure for QoS rule generation for non-IP data that use proprietary data protocol according to one or more embodiments.

FIG. 8 shows an example procedure for QoS rule generation for non-IP data that uses proprietary data protocols.

In one embodiment, if the data protocol used by the non-IP application is not standardized or known, some distinctive "signature information" may be carried in the data header and the NGC may utilize that signature information to generate a non-IP traffic detection rule and thus be able to provide a QoS rule for this non-IP data flow. One example of signature information carried in the non-IP data header may be a special coded flag octet or octets, such as "0x0FAF" in the first two octets of the header, which may identify a certain non-IP application. Another example of signature information carried in the non-IP data header may be a coded Service ID or Application ID in the header.

In FIG. 8, the WTRU 802 may send a PDU Establishment Request 820 to an SMF 804 where the PDU type is non-IP. The SMF 804 may send a PDU Establishment Response 821 to the WTRU 802 using a default QoS rule that the SMF 804 may have been pre-configured with 822. These default rules may be a set of traffic detection rules for non-IP applications, and each rule may include one or more of the following information: 1) the signature info that is supposed to be carried in the data header (such as "0x0FAF"); 2) the location of the signature info in the header (such as the first and second octet of the header); and 3) the length of the header. The SMF 804 may also install 823 these traffic detection rules in the corresponding UP-GW or UP traffic detection function 806 when the PDU session for the non-IP application is established. The default QoS profile associated with each traffic detection rule may also be configured in the SMF 804 and installed in the UP functions. The QoS profile may be a set of QoS parameters such as 5QI, allocation and retention policy (ARP), or the like. A QoS rule may be used to identify which QoS flow that a traffic flow belongs to and may have packet filters to map traffic flows resulting in a QoS flow ID. A QoS flow ID may be associated with a standard or non-standard QoS profile.

The UP-GW or the traffic detection function 806 may generate a traffic detected event 825 to the SMF 804 upon the detection of the certain non-IP data flow 824 from a non-IP server 810 according to the installed detection rules. If the default QoS profile is not available at the UP-GW or the traffic detection function 806 for the detected non-IP data flow, the SMF 804 may, upon detecting the non-IP traffic, generate 826 a corresponding QoS profile on its own or retrieve it from the policy function, and then provide it for installation 827 to the UP-GW or the traffic detection function 806.

The SMF 804 may provide 828 the same traffic detection rules and associated QoS profile to the WTRU so the WTRU can use them for the UL QoS rule.

RQoS treatment is also possible for this type of non-IP data. Because the UL data and DL data carry the same signature information, the WTRU may be able to directly use the DL QoS marking for the UL data that bears the same signature information as long as the WTRU is provided with the traffic detection rule about where to find the signature info.

In one embodiment, the use of RQoS may be dependent on an indication from the WTRU, although the network may still decide to not apply RQoS. In circumstances where the WTRU starts in an RQoS enabled network, the WTRU may indicate (i.e., to an SMF) its support for RQoS during a PDU session establishment. However, the WTRU may not be able to indicate support for RQoS if a PDU establishment procedure is not performed, such as in cases where the WTRU actually starts in the EPC where RQoS is not supported. For example, a WTRU may be capable of multi-RAT technology, such as E-UTRAN and 5G NR, and may first register with an EPC. The WTRU may have at least one PDU session in the EPC but cannot indicate support for RQoS since RQoS may not be supported in the EPC. At a later time, the WTRU may move and may undergo an inter-system change to a 5G CN, where the WTRU's PDU connection(s) will be moved to the 5G system were RQoS is supported, However, since the connections were already created in the EPC and now handed over to an NGC of 5G, the WTRU may not have an opportunity to indicate its support for RQoS in the NGC since the PDU establishment procedure has already been performed in the EPC. As such, the network may not be able to use RQoS for this WTRU until the WTRU establishes a new PDU session where an RQoS indication can be sent. Embodiments and procedures described herein may address the above scenario to enable a WTRU to send indications to enable use of RQoS for a PDU session that is already activated in a prior system related to an inter-system change.

Additionally, the embodiments and procedures as discussed herein may also be applicable to other features other than addressing RQoS during an intersystem change, such as where an ability or action is supported in one system but not a second system that the WTRU us transitioning to or from. For example, these techniques may also apply for a case where the WTRU supports a feature that is only available in LTE or the EPC but the WTRU is starting in a 5G NGC system first.

In one example, the WTRU may have policies or may be configured with information that allows it to determine which PDU sessions (e.g., based on APN or DDN) the WTRU supports RQoS. The indication of RQoS may be based on the WTRU being supportive of RQoS or the support may be indicated for specific PDU sessions; the embodiments discussed herein may apply to both.

The WTRU may send an indication of its RQoS support when it registers with an EPC system. The indication may be sent in mobility management messages or session management messages, or both. For mobility management messages, the WTRU may send this indication (or other indications for other NGC features or capabilities) in all NAS messages and not only in registration messages.

For the WTRU attaching or registering (either due to existing triggers for registration messages or due to inter-system change to EPC, such as from NGC), the WTRU may include this indication in the registration message, such as an Attach Request or Tracking Area Update request. Note that the latter may be due to a periodic registration. Moreover, the WTRU may send this indication in session management messages as well, either standalone or piggybacked in mobility management messages, such as an Attach Request.

The WTRU may indicate its support for RQoS using a specific information element (IE) or a bit where a value of one indicates "RQoS Supported" and a value of zero indicates "RQoS Not Supported" or vice versa. Alternatively, a set of bits (e.g. at least one octet) may be used to indicate the support of at least one feature such as RQoS. Each bit position may correspond to a feature or support of a particular operation or capability (e.g., RQoS). The WTRU may include any of these indications in mobility management or session management messages.

Alternatively, all of the indications proposed above (e.g., an indication for RQoS, etc.), may be included in a container that is stored and transparently passed to an NGC (e.g., the Access and Mobility Management Function (AMF)) during an inter-system change. The container may include mobility management or session management related information such as capabilities at the mobility management or session management level. Furthermore, the WTRU may send such information in separate mobility management and session management containers where each container has capability or feature support information related to mobility management and session management, respectively, procedures/features in the 5G system (or for an LTE system in case the WTRU is first in a 5G system). This container may be called a "UE CN Transparent Container" (UCTC) and may contain information for both mobility management and session management, or there may be two separate containers for each mobility management and session management. The WTRU may send this container or information in mobility management or session management messages.

Alternatively, the WTRU may include its support and desire to use RQoS in a Protocol Configuration Option (PCO) IE that is sent in session management messages (e.g., PDN Connection Request) or in mobility management messages. This may be an RQoS indication for all of the PDU's connections, per PDU connection, or per Access Point Name (APN)/Data Network Name (DNN). For example, during a PDN connection establishment in EPC, the WTRU may include a new indication for RQoS in the PCO or in the extended PCO (ePCO). A new value for the RQoS indication in the (e)PCO may be defined for both cases. When the WTRU sends the (e)PCO to the network, and when the network responds back to the WTRU, it may also include an RQoS indication in the (e)PCO that is included in the NAS message towards the WTRU.

The MME may receive a NAS message, optionally from a WTRU, with a new indication for the support or RQoS. The MME may save this information and send it towards the SGW/PGW-C. The MME may use a new indication on the interface between the MME and the SGW/PGW-C to reflect the support of RQoS by the WTRU, or it may send the same indication (e.g., in PCO or ePCO) towards the SGW/PGW-C. The PGW-C may also be assumed to be the SMF or it may support the functions of an SMF. Further, the MME may first verify against local policies or subscription information to determine if the use of RQoS for the WTRU in question is permitted, for example in a 5G system. If verification is successful, then the MME may forward this indication to the SGW/PGW-C.

The MME may also store the received RQoS information in the WTRU context and then forward the RQoS capability to the AMF upon inter-system change (e.g., as part of the session management context). The AMF may then send this capability to one or more SMFs/PGW-C during the handover from EPS to the 5G system.

The PGW-C may receive a message, for example from the SGW/MME, associated with a WTRU and the message may indicate that the WTRU supports RQoS. The indication may be a new indication over the S11/S5-C interface or it may be included in the PCO or ePCO. The SGW/PGW-C may verify (e.g., using local policies or subscription information) if the WTRU is allowed to use RQoS, for example in the 5G system. If verification is successful, the SGW/PGW-C may save this information in the WTRU's context. The PGW-C/SGW may send (e.g., in a response message towards the SGW/MME) a new indication (e.g., in the form of a new value in the PCO or ePCO) that the use of RQoS is allowed for the WTRU, for example in the 5G system. The MME may receive an indication from another network node, such as the SGW/PGW-C, that the use of RQoS is allowed for the WTRU. The MME/SGW may save this information in the WTRU's context. The SGW may forward this indication to the MME. The MME may forward this indication to the WTRU in mobility management or session management messages. The MME may use a new indication in the NAS message or it may include this indication in the PCO or ePCO, optionally as received from the SGW/PGW-C.

The WTRU may receive in a NAS mobility management or session management message an indication that the use of RQoS is supported/allowed, optionally for a target system such as 5G when the WTRU performs inter-system change to the target system. The WTRU may save this information and use it as a trigger to include support for RQoS indication when it performs an inter-system change to a target system (e.g., 5G system).

Figure 9:
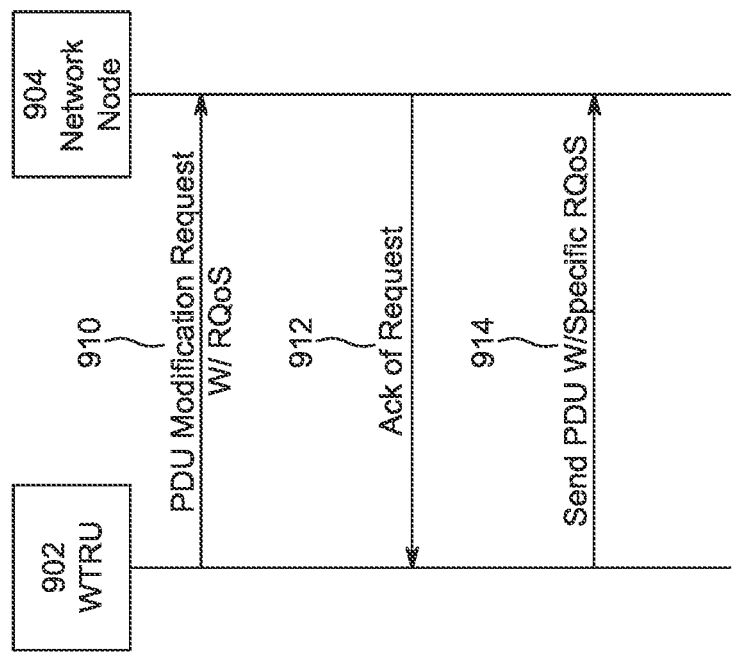
FIG. 9 is an example procedure for addressing RQoS for one or more PDU(s) during an inter-system change.

FIG. 9 shows an example of a WTRU procedure to enable RQoS for one or more PDUs after an inter-system change. Upon performing an inter-system change to a target system (e.g., 5G system), a WTRU 902 may include an indication for the support or desire to use the RQoS feature. The WTRU may communicate with a network node 904 of the target system (e.g., 5G system). The network node 904 may be any node, reached directly or indirectly, in an NGC such as a gNB, AMF, SMF, or a UPF. The WTRU 902 may include the indication in the NAS mobility management message or session management message, or both. The WTRU 902 may include the indication as a new IE or as a new value in a PCO or ePCO IE. The WTRU may send a PDU modification request 910 to inform the 5G system that it wants to use, or it supports the use of, RQoS for one or more PDUs session(s) that has already been established in a previous system (e.g., the EPC). The WTRU may perform the PDU session modification procedure for all or a subset of PDU sessions transferred from the EPC to NGC of a 5G system. Alternatively, the WTRU 902 may include this message in any NAS session management message, such as when the NAS session management message is a PDU connectivity request, such as a registration request, with a type set to "handover". The WTRU 902 may include the indication for every PDU session registration request that it wants to handover form a source system (e.g., from the EPC) to a target system (e.g., to a NGC). In one instance, the indication may already be included if the WTRU 902 has already sent an RQoS indication for the same PDU while the WTRU 902 was in the source system (e.g., EPC), such as when the WTRU 902 receives an acknowledgment from the source system (e.g. EPC) that RQoS for the target system (e.g., NGC) is allowed, as discussed herein. Once the indication has been received at the network node 904 of the target system, the network node 904 may respond with an acknowledgment (ACK) 912 of the indication. After the WTRU 902 receives the ACK 912 then it may proceed with sending PDUs with specific RQoS 914. Alternatively, the WTRU 902 may not require an ACK, and the WTRU 902 may begin sending PDUs with specific RQoS after the inter-system change is complete.

Alternatively, the WTRU may be configured to deactivate and reactive its PDU sessions so that it can include the RQoS support indication when it performs an inter-system change from a source system (e.g., EPC) to a target system (e.g., NGC).

Upon an inter-system change to a NGC, the WTRU may include an indication in the NAS mobility management and/or session management messages that it desires or supports the use of RQoS, and it may do this for all PDU sessions that need to be transferred to the NGC, or regardless of all PDU sessions that need to be transferred. The NGC, such as the AMF, SMF, or both, may verify against local policies or subscription information if the WTRU is allowed to do so. The SMF or AMF or both, may respond to the WTRU and indicate the use of RQoS is either allowed or not allowed, for example per PDU session.

The AMF may request context information from the MME, for a WTRU that has performed inter-system change from EPC to NGC. The MME may forward any indications about the use or support of RQoS that it may have received from the WTRU when it was in the EPC.

In one embodiment there may be an indication of network slice selection assistance information (S-NSSAI) for EPC-NGC inter-working. In a version of LTE there may be no network slicing concept; consequently, when a PDN connection is established in the EPC it may not be associated with a particular slice. However, the same PDN connection may be transferred to the NGC during an inter-system change from EPC to NGC. Since the PDU session in the NGC may be associated to a particular network slice, when the PDN connection from LTE is handed over to the NGC, the WTRU may need to have knowledge about the slice associated with the NGC PDU session. There may be procedures that are used to inform the WTRU about the slice corresponding to a PDU session that was originally established in the EPC system.

In one example demonstrating S-NSSAI indication when interworking with EPC and NGC, the WTRU may include one or more S-NSSAI information in the Protocol Configuration Option (PCO) part of the PDN connection request NAS message in an EPC, such as based on the configured (Network slice selection policy) NSSP at the WTRU. As described earlier, the PCO part of the message may be transparent to the MME hence S-NSSAI information may be stored in the PGW-C/SMF node at the EPC during the PDN connection establishment procedure. The WTRU may receive the selected S-NSSAI in the PCO of the PDN connection accept message from the EPC. Note that it may be possible for the EPC network to send the S-NSSAI in the PDN connection accept message even if this information is not included by the WTRU in the PDN connection request message. In any case, the PGW-C/SMF may check the local policy, WTRU subscription and/or interact with other network nodes (e.g., NSSF, HSS/UDM) to select the S-NSSAI for the PDN connection. The selected S-NSSAI may then be returned to the WTRU in the PDN connection accept message.

In another example, the SMF/PGW-C may not send S-NSSAI information to the WTRU during the PDN connection procedure in LTE. The SMF/PGW-C may store the S-NSSAI information (if received by the WTRU in the PCO). The SMF/PGW-C may then send the stored S-NSSAI values to the AMF during the intersystem change (e.g., EPC to NGC handover or EPC to NGC idle mode mobility). If multiple PDN connections are transferred to the NGC, then SMF(s) corresponding to each PDU session may send the S-NSSAI information to the AMF during the intersystem change. The AMF, based on the allowed NSSAI and/or the local policy, may determine S-NSSAI associated with the PDU session. The AMF may then return the determined S-NSSAI back to each SMF. The SMF may then store this information in the PDU session context or the WTRU SM context. Alternatively, when the AMF receives the SMF/PGW-C address during the inter-system change, the AMF may determine the S-NSSAI for each active PDU session based on the SMF information and/or allowed NSSAI. The AMF may then send the S-NSSAI to SMF corresponding to each PDU session.

When the SMF receives the S-NSSAI associated with a PDU session transferred from the EPC, each SMF may trigger a network initiated PDU session modification procedure. The PDU modification message to the WTRU may include the S-NSSAI for the corresponding PDU session.

It may also be possible that when the WTRU receives the allowed NSSAI after registration update procedure in the NGC upon intersystem change, the WTRU determines that the PDU sessions in the NGC are not associated with an S-NSSAI. The WTRU may therefore send the S-NSSAI to the network (e.g., AMF and SMF) by triggering the PDU session modification procedure for each PDU session transferred from an EPC to an NGC.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for handling quality of service (QOS) during an inter-system change, the method comprising:
   providing a modification message, the modification message comprising information associating at least one traffic flow associated with a 5G system (5GS) network to a bearer associated with an evolved packet system (EPS) network, wherein the information indicates a mapping for the at least one traffic flow associated with the 5GS network to a QoS class identifier (QCI) corresponding to the bearer associated with the EPS network, the information further indicating one or more traffic flow templates (TFTs) and one or more packet filters, the one or more packet filters to be applied upon the inter-system change from the 5GS network to the EPS network; and
   receiving data associated with the at least one traffic flow in the EPS via the bearer corresponding to the QCI in accordance with the one or more TFTs and the one or more packet filters.

2. The method of claim 1, wherein the data is part of a PDU session.

3. The method of claim 1, wherein the inter-system change is part of a request that includes one or more of a Session Management (SM), Mobility Management (MM), or a tracking area update (TAU) message.

4. The method of claim 1, wherein the QCI is indicative of a specific QoS for the data.

5. The method of claim 1, wherein a PDU session was established with the 5GS network prior to the inter-system change.

6. The method of claim 1, wherein the modification message is provided by a session management function (SMF).

7. The method of claim 1, wherein the received data is provided by a wireless transmit/receive unit (WTRU).

8. A network node for handling quality of service (QOS) during an inter-system change, the WTRU comprising:

a transceiver configured to provide a modification message, the modification message comprising information associating at least one traffic flow associated with a 5G system (5GS) network to a bearer associated with an evolved packet system (EPS) network, wherein the information indicates a mapping for the at least one traffic flow associated with the 5GS network to a quality of service class identifier (QCI) corresponding to the bearer associated with the EPS network, the information further indicating one or more traffic flow templates (TFTs) and one or more packet filters, the one or more packet filters to be applied upon the inter-system change from the 5GS to the EPS network; and the transceiver configured to receive data associated with the at least one traffic flow in the EPS via the bearer corresponding to the QCI in accordance with the one or more TFTs and the one or more packet filters.

9. The network node of claim 8, wherein the data is part of a PDU session.

10. The network node of claim 8, wherein the inter-system change is part of a request that includes one or more of a Session Management (SM), Mobility Management (MM), or a tracking area update (TAU) message.

11. The network node of claim 8, wherein the QCI is indicative of a specific QoS for the data.

12. The network node of claim 8, wherein a PDU session was established with the 5GS network prior to the inter-system change.

13. The network node of claim 8, wherein the network node comprises a session management function (SMF).

14. The network node of claim 8, wherein the received data is provided by a wireless transmit/receive unit (WTRU).

15. At least one non-transitory computer-readable storage medium having executable instructions stored thereon, that when executed by a network node cause the network node to:

provide a modification message, the modification message comprising information associating at least one traffic flow associated with a 5G system (5GS) network to a bearer associated with an evolved packet system (EPS) network, wherein the information indicates a mapping for the at least one traffic flow associated with the 5GS network to a QoS class identifier (QCI) corresponding to the bearer associated with the EPS network, the information further indicating one or more traffic flow templates (TFTs) and one or more packet filters, the one or more packet filters to be applied upon the inter-system change from the 5GS network to the EPS network; and receive data associated with the at least one traffic flow in the EPS via the bearer corresponding to the QCI in accordance with the one or more TFTs and the one or more packet filters.

16. The at least one non-transitory computer-readable storage medium of claim 15, wherein the data is part of a PDU session.

17. The at least one non-transitory computer-readable storage medium of claim 15, wherein the inter-system change is part of a request that includes one or more of a Session Management (SM), Mobility Management (MM), or a tracking area update (TAU) message.

18. The at least one non-transitory computer-readable storage medium of claim 15, wherein the QCI is indicative of a specific QOS for the data.

19. The at least one non-transitory computer-readable storage medium of claim 15, wherein a PDU session was established with the 5GS network prior to the inter-system change.

20. The at least one non-transitory computer-readable storage medium of claim 15, wherein the network node comprises a session management function (SMF).

* * * * *